US012724125B2

(12) United States Patent
Koehler

(10) Patent No.: US 12,724,125 B2
(45) Date of Patent: Sep. 1, 2026

(54) STATIONARY AND MOBILE SCANNING OPERATIONS

(71) Applicant: Trimble Inc., Westminster, CO (US)

(72) Inventor: Volker Koehler, Berlin (DE)

(73) Assignee: Trimble Inc., Westminster, CO (US)

(*) Notice: Subject to any disclaimer, the term of this patent is extended or adjusted under 35 U.S.C. 154(b) by 1009 days.

(21) Appl. No.: 17/955,148

(22) Filed: Sep. 28, 2022

(65) Prior Publication Data

US 2024/0103139 A1 Mar. 28, 2024

(51) Int. Cl.

| | |
|---|---|
| ***G01S 7/481*** | (2006.01) |
| ***G01P 15/08*** | (2006.01) |
| ***G01S 7/4865*** | (2020.01) |
| ***G01S 7/51*** | (2006.01) |
| ***G01S 17/10*** | (2020.01) |
| ***G01S 17/89*** | (2020.01) |

(52) U.S. Cl.

CPC .......... *G01S 7/4817* (2013.01); *G01S 7/4865* (2013.01); *G01S 7/51* (2013.01); *G01S 17/10* (2013.01); *G01S 17/89* (2013.01); *G01P 15/08* (2013.01)

(58) Field of Classification Search

CPC ............................ G01S 7/4817; G01S 7/4865

See application file for complete search history.

(56) References Cited

U.S. PATENT DOCUMENTS

| | | | | |
|---|---|---|---|---|
| 8,358,341 | B2 | 1/2013 | Trenary et al. | |
| 9,001,205 | B2 * | 4/2015 | Nordenfelt | H04N 23/62 356/3.01 |
| 10,073,165 | B2 | 9/2018 | Nordenfelt et al. | |
| 10,254,395 | B2 | 4/2019 | Nichols et al. | |
| 10,365,352 | B2 | 7/2019 | Nordenfelt et al. | |
| 10,816,646 | B2 * | 10/2020 | Lekås | G01S 7/4817 |
| 10,914,582 | B2 * | 2/2021 | Prudlow | G01C 3/08 |
| 11,280,890 | B2 * | 3/2022 | Ekengren | G01S 7/497 |
| 11,635,490 | B2 * | 4/2023 | Vogel | G01S 17/86 356/4.01 |

(Continued)

FOREIGN PATENT DOCUMENTS

WO 2015/126491 A1 8/2015

OTHER PUBLICATIONS

Extended European Search Report for Application No. 23199715.6-1009, date of completion of the search Feb. 6, 2024, 8 pages.

*Primary Examiner* — Marisa V Conlon

(74) *Attorney, Agent, or Firm* — Kilpatrick Townsend & Stockton LLP

(57) ABSTRACT

A scanning surveying system includes a base, an alidade mounted on the base an rotatable relative to the base about a first axis, a first motor that can rotate the alidade relative to the base, a rotating optical element coupled to the alidade and rotatable relative to the alidade about a second axis, a second motor that can rotate the rotating optical element relative to the base, an optical distance measuring unit, a sensor that can detect a motion of the scanning surveying system, and a controller. The controller can control the optical distance measuring unit (i) to perform stationary scanning operations and (ii) to automatically execute mobile scanning operations in response to a detection of motion of the scanning surveying system by the sensor. The controller can also register point cloud data from the stationary scanning operations and/or the mobile scanning operations.

20 Claims, 5 Drawing Sheets

(56) References Cited

U.S. PATENT DOCUMENTS

| | | | | |
|---|---|---|---|---|
| 11,733,043 | B2 * | 8/2023 | Hinderling | G01C 15/006 356/4.01 |
| 12,117,564 | B2 * | 10/2024 | Vogel | H04N 23/695 |
| 2020/0109937 | A1 | 4/2020 | Zweigle et al. | |
| 2020/0109943 | A1 | 4/2020 | Buback et al. | |
| 2021/0389430 | A1 | 12/2021 | Vogel | |

* cited by examiner

STATIONARY AND MOBILE SCANNING OPERATIONS

TECHNICAL FIELD

The present invention relates to scanning surveying systems performing automatic mobile scanning operations.

BACKGROUND

A conventional scanning surveying system comprises an optical distance measuring unit generating a beam of measuring light which can be directed to an object. The object reflects or scatters some of the incident measuring light such that the optical distance measuring unit receives measuring light back from the object. The optical distance measuring unit may then determine the distance of the object from the optical distance measuring unit based on, for example, a time-of-flight analysis.

The scanning surveying system further comprises a rotating mirror, wherein the optical distance measuring unit directs the generated beam of measuring light onto the rotating mirror from which the beam is reflected to objects surrounding the scanning surveying system depending on the rotational position of the rotating mirror.

The optical distance measuring unit and the rotating mirror are typically mounted on an alidade which is rotatable relative to a tripod about a vertical axis, and the rotating mirror is typically rotatable about a horizontal axis. The alidade can be driven about the vertical axis over a range of 180° at a relatively low speed, driving the rotating mirror at a high speed enabling the optical measuring unit to perform distance measurements as part of scanning operations. During such scanning operations, the scanning surveying system can be stationary. Further scanning operations may involve the scanning surveying system being moved to another location and manually controlled to perform the additional stationary scanning operations. Each subsequent stationary scanning operation may require manual configuring of the scanning surveying system, even if the settings for each scanning operation are the same. Additionally, the scanning surveying system typically does not perform scanning operations while being transported between locations. It is desired that an amount of data collected as part of scanning operations can be increased. Additionally, it is desired that an amount of time involved in setting up scanning operations can be reduced.

SUMMARY

Accordingly, it is an object of the present invention to provide a scanning surveying system offering a broader range of applications.

According to embodiments of the present invention, a scanning surveying system comprises a base, an alidade mounted on the base such that it is rotatable relative to the base about a first axis, a first motor configured to rotate the alidade relative to the base, a rotating optical element coupled to the alidade and rotatable relative to the alidade about a second axis, a second motor configured to rotate the rotating optical element relative to the alidade, an optical distance measuring unit configured to direct measuring light onto the rotating optical element such that the measuring light is directed towards objects surrounding the scanning surveying system, and to receive measuring light back from the objects, and one or more sensors (e.g., an inertial measurement unit (IMU)) configured to detect a motion of the scanning surveying system.

The base can be provided by a tripod, for example. Other configurations for mounting the alidade are possible, however. In some embodiments, it is possible to orient the base such that the first axis is oriented in the vertical direction, i.e. parallel to the direction of gravity at a given measuring site. The second axis can be oriented orthogonal to the first axis. This is not a requirement, however. The optical distance measuring unit is configured to output data representing the distance from the optical distance measuring unit of the object from which the emitted measuring light is received back. For example, the optical distance measuring unit may use a time-of-flight method such that the data representing the distance is determined based on a time difference between the time of emission of a pulse of measuring light from the optical distance measuring unit and a time of receipt by the optical distance measuring unit of measuring light from an object corresponding to the emitted pulse. Other distance measuring techniques, such as phase shift measurements and combinations of time-of-flight and phase shift measurements, can be used by the optical distance measuring unit as well.

The rotating optical element may be a mirror, a prism, or the like to direct and/or reflect the measuring light. The sensor (e.g., IMU) can detect movement of the scanning surveying system using gyroscopes and accelerometers. For example, the IMU can detect when the scanning surveying system is stationary (e.g., not in motion) and when the scanning surveying system is in motion, such as when the scanning surveying system is being carried between scanning locations. According to some embodiments, the IMU can detect motion of the scanning surveying system in conjunction with signals received from at least one of a compass, a global positioning system, or a global navigation satellite system.

According to some embodiments, the scanning surveying system comprises a controller configured to control the optical distance measuring unit (i) to perform stationary scanning operations, and (ii) to automatically execute mobile scanning operations in response to a detection of motion of the scanning surveying system by the inertial measurement unit. The stationary scanning operations can be performed when the scanning surveying system is stationary. For example, the scanning surveying system may be set up at a first scanning location. The controller can control the optical distance measuring unit to perform stationary scanning operations by controlling the second motor to rotate continuously while rotating the alidade, and by triggering the generation of at least one pulse of measuring light to perform a distance measurement using portions of the at least one pulse of measuring light reflected back from objects surrounding the scanning surveying system.

After the stationary scanning operations are complete, the scanning surveying system may be moved to a second scanning location. The IMU may detect the motion of the scanning surveying system as the scanning surveying system is being moved to the second scanning location. In response to detection of the motion by the IMU, the controller can control the optical distance measuring unit to automatically execute mobile scanning operations. The mobile scanning operations may involve the controller controlling the second motor to rotate continuously. Additionally, the mobile scanning operations may involve the controller controlling the optical distance measuring unit to trigger the generation of at least one pulse of measuring light to perform a distance measurement using portions of the at least one pulse of measuring reflected back from the objects surrounding the scanning surveying system. In some embodiments, the mobile scanning operations can involve a profile scan that is executed without rotating the alidade relative to the base.

According to some embodiments, the controller can register stationary scan data from the stationary scanning operations using mobile scan data from the mobile scanning operations. Alternatively, the controller can register mobile scan data from the mobile scanning operations using stationary scan data from the stationary scanning operations.

According to some embodiments, the controller can control the optical distance measuring unit to terminate the mobile scanning operations in response to detection, by the IMU, of the scanning surveying system being stationary for a predetermined amount of time. For example, the IMU can detect that the scanning surveying system has been stationary for the predetermined amount of time once the scanning surveying system has been set up at the second scanning location. After termination of the mobile scanning operations, the controller can automatically execute the stationary scanning operations. In some embodiments, the stationary scanning operations at the second scanning location may be automatically configured according to the stationary scanning operations performed at the first scanning location. In this way, the stationary scanning operations can be automatically executed once the scanning surveying system is positioned at the second scanning location without requiring input from a user.

According to some embodiments, the scanning surveying system comprises at least one camera configured to record at least one image. The at least one camera can be mounted on the alidade. Herein, the at least one camera can be mounted directly on the alidade, i.e. on a component which is rigidly connected with the alidade, or it can be indirectly mounted on the alidade, i.e. it can be mounted on a component which is itself mounted on the alidade to be movable or rotatable relative to the alidade. However, the mounting of the at least one camera on the alidade results in a corresponding rotation of the at least one camera relative to the base about the first axis.

The camera can be an optical camera detecting visible light such that the camera detects a visible-light image of objects surrounding the scanning surveying system. The camera may also detect light of other spectral ranges than visible light in order to record infrared-light or near-infrared-light images of the objects surrounding the scanning surveying system. The at least one camera may have a two-dimensional image sensor for detecting the image. The two-dimensional image sensor is configured to determine data representing a location in the coordinate system of the image sensor where detected light was incident on the image sensor. The two-dimensional image sensor may include a plurality of pixels. The pixels are detector elements within the two-dimensional image sensor which are configured to detect light which is incident on the detector. The pixels may be arranged in a regular two-dimensional array pattern, for example. In some embodiments, the camera may be configured to record at least one image during the mobile scanning operations.

According to some embodiments, the scanning surveying system comprises a user interface including a display. The user interface can be of any type allowing interaction of the scanning surveying system and a human user thereof. The display of the user interface can be configured to display information to the user. The display may include displays such as a computer screen, the display of a mobile device, such as a tablet computer or telephone, a head mounted display and other display configurations. The display may include a liquid crystal display, a light-emitting diode display, such as an OLED, AMOLED, QD-LED, and other suitable types.

In some examples, the user interface may include a keyboard. Moreover, the user interface may display a cursor, pointer or other indicator representing a selected position on the display itself.

The user may move the selected position around on the display by hitting keys of the keyboard or operating a mouse, for example. Moreover, the display may be configured to be touch-sensitive and to detect touch events on the display. For example, the controller may receive a command from the user to terminate the mobile scanning operations via a detected touch event relative to the touch screen.

Accordingly an embodiment, the invention includes a method of operating a scanning surveying system, wherein the scanning surveying system comprises a base, an alidade mounted on the base and rotatable relative to the base about a first axis, a first motor configured to rotate the alidade relative to the base, a rotating optical element coupled to the alidade and rotatable relative to the alidade about a second axis, a second motor configured to rotate the rotating optical element relative to the alidade, an optical distance measuring unit configured to direct measuring light onto the rotating optical element such that the measuring light is directed towards objects surrounding the scanning surveying system, and to receive portions of the measuring light reflected back from the objects, a sensor (e.g., an inertial measurement unit (IMU)) configured to detect a motion of the scanning surveying system, and a controller configured to control the optical distance measuring unit. The method comprises controlling, by the controller, the optical distance measuring unit to perform stationary scanning operations; detecting, by the inertial measurement unit, a motion of the scanning surveying system; and in response to detecting the motion of the scanning surveying system, controlling, by the controller, the optical distance measuring unit to automatically perform mobile scanning operations.

According to some embodiments, the method can comprise the optical distance measuring unit generating at least one pulse of measuring light and performing a distance measurement using the portions of measuring light during the stationary scanning operations and the mobile scanning operations. For example, the controller can control the second motor to rotate continuously during the stationary scanning operations and the mobile scanning operations and to trigger the generation of the at least one pulse of the measuring light and the performing of the distance measurement during the stationary scanning operations and the mobile scanning operations. In some embodiments, the mobile scanning operations can comprise performing a profile scan without rotating the alidade relative to the base.

According to some embodiments, controlling the optical distance measuring unit to perform the mobile scanning operations further comprises automatically executing, by the optical distance measuring unit, the mobile scanning operations until the IMU detects that the scanning surveying system is stationary for a predetermined amount of time. In some embodiments, the controller can control the optical distance measuring unit to terminate the mobile scanning operations and to automatically execute the stationary scanning operations in response to detection of the scanning surveying system being stationary for the predetermined amount of time. In some embodiments, the IMU may determine the motion of the scanning surveying system in conjunction with signals received from at least one of a compass, a global positioning system, or a global navigation satellite system.

According to some embodiments, controlling the optical distance measuring unit to terminate the mobile scanning operations further comprises terminating the mobile scanning operations in response to receiving a command from a user. For example, the scanning surveying system may further comprise a user interface including a touch screen. The command from the user may be received via a detected touch event relative to the touch screen.

According to some embodiments, the stationary scanning operations are first stationary scanning operations, and after controlling the optical distance measuring unit to automatically perform the mobile scanning operations, the method also includes controlling, by the controller, the optical distance measuring unit to perform second stationary scanning operations; and registering, by the controller, first point cloud data from the first stationary scanning operations and second point cloud data from the second stationary scanning operations. The first point cloud data and the second point cloud data may be registered using stationary scan data from the first and second stationary scanning operations and/or using mobile scan data from the mobile scanning operations.

According to some embodiments, the scanning surveying system further comprises at least one camera. The method may further comprise recording, by the at least one camera, at least one image during the mobile scanning operation.

According to embodiments of the present invention, a scanning surveying system comprises a base, an alidade mounted on the base such that it is rotatable relative to the base about a first axis, a first motor configured to rotate the alidade relative to the base, a rotating optical element coupled to the alidade and rotatable relative to the alidade about a second axis, a second motor configured to rotate the rotating optical element relative to the alidade, an optical distance measuring unit configured to direct measuring light onto the rotating optical element such that the measuring light is directed towards objects surrounding the scanning surveying system, and to receive measuring light back from the objects, and an inertial measurement unit (IMU) configured to detect a motion of the scanning surveying system.

According to some embodiments, the scanning surveying system further comprises a controller configured to control the optical distance measuring unit to automatically perform stationary scanning operations in response to a detection that the scanning surveying system has been stationary for a predetermined amount of time after a detection of motion by the IMU. For example, the IMU may detect that the scanning surveying system has been stationary for the predetermined amount of time after the scanning surveying system has been moved from a first scanning location to a second scanning location.

Accordingly an embodiment of the invention includes a method of operating a scanning surveying system, wherein the scanning surveying system comprises a base, an alidade mounted on the base and rotatable relative to the base about a first axis, a first motor configured to rotate the alidade relative to the base, a rotating optical element coupled to the alidade and rotatable relative to the alidade about a second axis, a second motor configured to rotate the rotating optical element relative to the alidade, an optical distance measuring unit configured to direct measuring light onto the rotating optical element such that the measuring light is directed towards objects surrounding the scanning surveying system, and to receive portions of the measuring light reflected back from the objects, an inertial measurement unit (IMU) configured to detect a motion of the scanning surveying system, and a controller configured to control the optical distance measuring unit. The method comprises detecting, by the inertial measurement unit, a motion of the scanning surveying system; subsequent to detecting the motion of the scanning surveying system, detecting, by the IMU, that the scanning surveying system has been stationary for a predetermined amount of time; and in response to detecting that the scanning surveying system has been stationary for the predetermined amount of time, controlling, by the controller, the optical distance measuring unit to automatically perform stationary scanning operations.

BRIEF DESCRIPTION OF THE DRAWINGS

Embodiments of the invention will be illustrated with reference to the drawings below. Herein.

DETAILED DESCRIPTION

Figure 1:
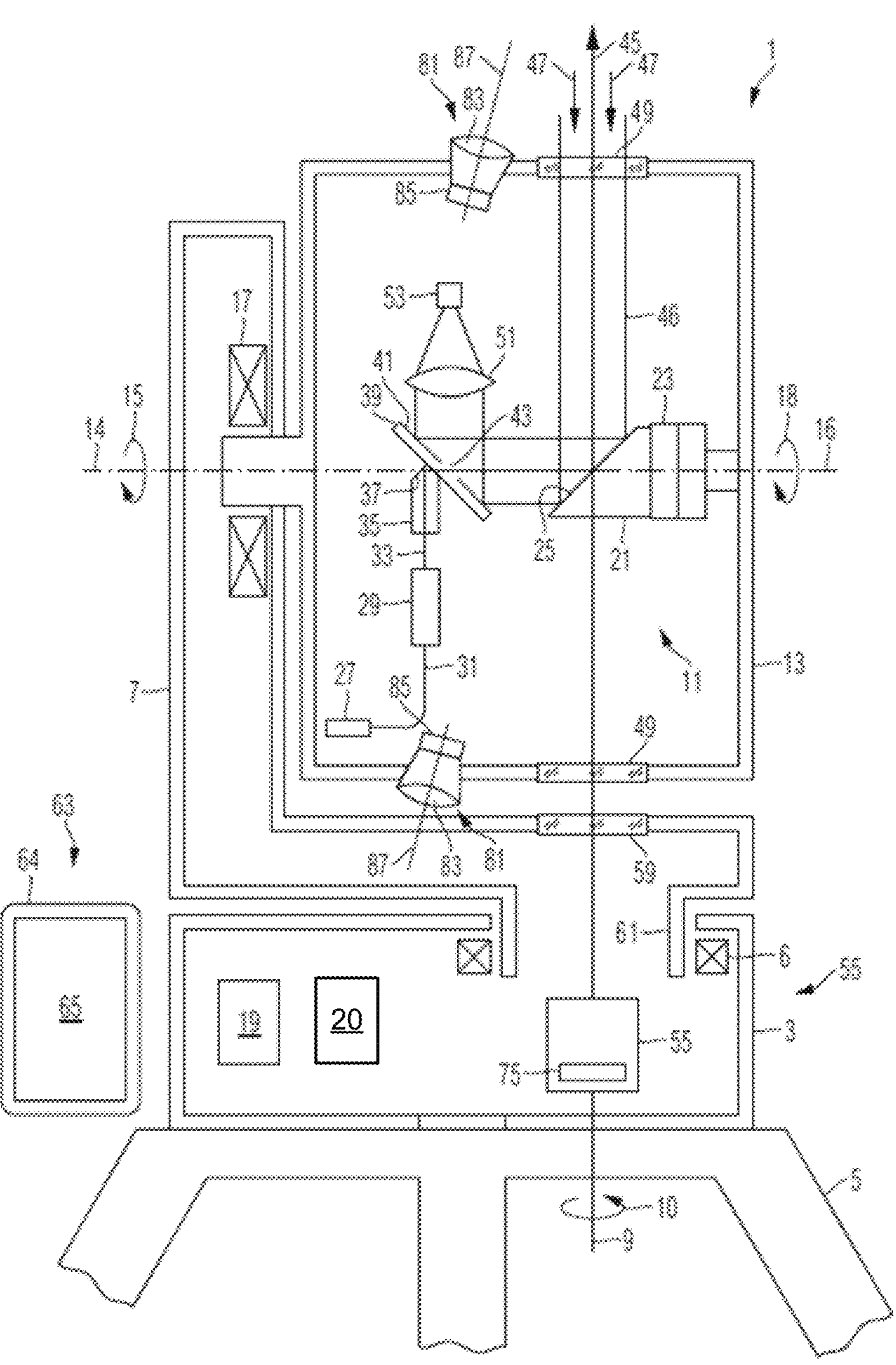
FIG. 1 is a schematic sectional view of an embodiment of a scanning surveying system.

Exemplary scanning surveying systems will be illustrated with reference to FIGS. 1 to 5 below. FIG. 1 is a schematic sectional view of an embodiment of a scanning surveying system 1.

The scanning surveying system 1 comprises a base 3 mounted on a tripod 5, and an alidade 7. The alidade 7 is mounted on the base 3 and can be rotated relative to the base 3 about a first axis 9 as indicated by an arrow 10 in FIG. 1. The tripod 5 can be adjusted such that the first axis 9 is oriented in the vertical direction when the scanning surveying system 1 is used. A first motor 6 is provided to rotate the alidade 7 relative to the base 3. The first motor 6 is controlled by a controller 19 mounted within the base 3, or on any other suitable component of the scanning surveying system 1. The scanning surveying system 1 may further comprise a rotational encoder (not shown in FIG. 1) connected to the controller 19 so that the controller 19 can measure the current rotational position of the alidade 7 relative to the base 3. The scanning surveying system 1 may further comprise one or more sensors (for example an inertial measurement unit (IMU) 20) that can detect a motion of the scanning surveying system 1. The IMU 20 may detect motion of the scanning surveying system 1 using gyroscopes and accelerometers. While the examples provided herein use an IMU, it should be appreciated that any other sensor or sensors may also be used with the embodiments described to detect or confirm motion of the scanning surveying system 1 such as a global positioning system, circular level (spirit level or plummets), compass, camera(s), and/or the like.

The scanning surveying system 1 further comprises an optical distance measuring unit 11 mounted on a mounting structure 13. The mounting structure 13 is mounted on the alidade 7 and rotatable relative to the alidade 7 about a third axis 14 as indicated by an arrow 15 in FIG. 1. The third axis 14 is substantially orthogonal to the first axis 9 of rotation of the alidade 7 relative to the base 3. A second motor 17 is provided to rotate the mounting structure 13 relative to the alidade 7. The second motor 17 is controlled by the controller 19. Moreover, the scanning surveying system 1 may comprise a rotational encoder (not shown in FIG. 1) connected to the controller 19 so that the controller 19 can measure the current rotational position of the mounting structure 13 relative to the alidade 7.

The optical distance measuring unit 11 comprises a rotating mirror 21 carried by a third motor 23 mounted on the mounting structure 13. The third motor 23 is controlled by the controller 19 and rotates the rotating mirror 21 about a second axis 16 of rotation as indicated by an arrow 18 in FIG. 1. The second axis 16 of rotation of the mirror may substantially coincides with the third axis 14 of rotation of the mounting structure 13 relative to the alidade 7. In this example, the rotating mirror 21 has a substantially flat mirror surface 25 having a surface normal oriented at an angle of 45 degrees relative to the second axis 16 of rotation of the rotating mirror 21.

The optical distance measuring unit 11 further comprises a light source 27, such as a laser source, pulsed laser source and/or a fiber laser, for example. The light source 27 is mounted on the mounting structure 13 and configured to generate light pulses which are supplied to an emitting element 29, such as a collimation lens, via a fiber 31. A thin beam 33 of measuring light is emitted from the emitting element 29, enters a glass prism 35 and is reflected from an internal surface 37 of the prism 35 such that it substantially coincides with the second axis 16 of rotation of the rotating mirror 21. The thin beam 33 of measuring light leaves the prism 35 through a glass plate 39. The glass plate 39 has a mirror surface 41 having a surface normal which can be oriented relative to the second axis 16 of rotation of the rotating mirror 21 at an angle of 45 degrees, for example. The mirror surface 41 has a central portion 43 traversed by the thin beam 33 of measuring light. The central portion 43 may carry an antireflective coating such that a low amount of the measuring light is reflected from the mirror surface 41 while the main portion of the thin beam 33 of measuring light is incident on the mirror surface 25 at an angle of degrees. When the rotating mirror 21 is oriented as shown in FIG. 1, the thin beam 33 of measuring light is reflected from the mirror surface 25 such that the thin beam 33 of measuring light is emitted from the scanning surveying system 1 as indicated by an arrow 45 in FIG. 1. This measuring light will be incident on an object, and a portion of that light is scattered by the object or reflected from the object such that it travels back to the scanning surveying system 1 as a broader beam 46 as indicated by arrows 47 in FIG. 1.

The mounting structure 13 comprises one or more windows 49 allowing the thin beam 33 of measuring light to leave the optical distance measuring unit 11 and the light 47 received back from the object to enter the optical distance measuring unit 11. The window 49 can be a single ring-shaped window extending around the second axis 16 of rotation of the rotating mirror 21.

The light received back from the object is incident on the mirror surface 25 of the rotating mirror 21, and is reflected from the mirror surface 25 to be incident on the mirror 41. Apart from its central portion 43, the mirror surface 41 carries a reflective coating such that most of the light received back from the object is directed towards a focusing lens 51 concentrating the light received back from the object onto a detector 53. Detection signals produced by the detector 53 are supplied to the controller 19. The controller 19 may measure differences between times when light pulses are generated by the light source 27 and corresponding times when these light pulses are detected by the detector 53. These time differences represent the time of flight of a light pulse from the measuring unit to the object and from the object back to the optical distance measuring unit 11. This measured time of flight is indicative of the distance of the object from the scanning surveying system 1.

The controller 19 may control the third motor 23 to rotate the mirror 21 about the second axis 16. This results in the light beam 45 emitted from the scanning surveying system 1 to rotate about the second axis 16 in a plane orthogonal to the second axis 16. By operating the first motor 6 in order to rotate the alidade 7 about the first axis 9, the controller 19 may direct the measuring light beam 45 emitted from the scanning surveying system 1 in any direction.

The scanning surveying system 1 in this example further comprises a calibration unit 55 configured to determine properties of the scanning surveying system 1. Details of a calibration unit suitable for integration in the scanning surveying system 1 are illustrated in European patent applications of the present applicant with application numbers 19 157 547.1 and 19 157 555.4 filed on Feb. 2, 2019, wherein the whole disclosure of these patent applications is incorporated herein by reference.

The alidade 7 includes a window 59 and a hollow shaft 61 such that the light beam 45 may enter the calibration unit 55, and that calibration light generated by the calibration unit 55 can be directed on components mounted on the alidade 7.

The scanning surveying system 1 further comprises plural cameras 81 mounted on the mounting structure 13. Each camera 81 comprises an objective lens 83 and a position sensitive detector 85 and is configured to record visual images of the surroundings of the scanning surveying system 1. Each camera 81 has a main axis 87 defined by the optical axis of the objective lens 83. The plural cameras 81 differ with respect to the orientations of their main axes 87 relative to the mounting structure 13. The main axes 87 of the plural cameras 81 differ with respect to their orientation in the circumferential direction about the third axis 14 and with respect to the azimuthal direction with respect to the first axis 9. The cameras 81 can be used to record visual light images of the surroundings of the surveying system simultaneously with the recording of distance measurements using the measuring light beam 45 reflected from the rotating mirror 21, for example.

The scanning surveying system 1 further comprises a graphical user interface 63 formed by a tablet computer 64 having a touch screen 65 in the illustrated embodiment. The controller 19 can receive commands from a user via detected touch events relative to the touch screen 65. For example, the controller 19 can receive commands for configuring or terminating stationary scanning operations or mobile scanning operations performed by the optical distance measuring unit 11.

The cameras 81 are connected to the controller 19 by a wireless or a wire-based data connection. The controller 19 is configured to obtain image data representing the images recorded by the cameras 81. The controller 19 may process the image data using suitable image processing algorithms. For example, the controller 19 may process the images in order to adjust brightness and contrast and to change the image resolution or number of pixels per image.

The controller 19 is further configured to display the images recorded by the cameras 81 on the touch screen 65 by sending the image data to the graphical user interface 63.

Figure 2:
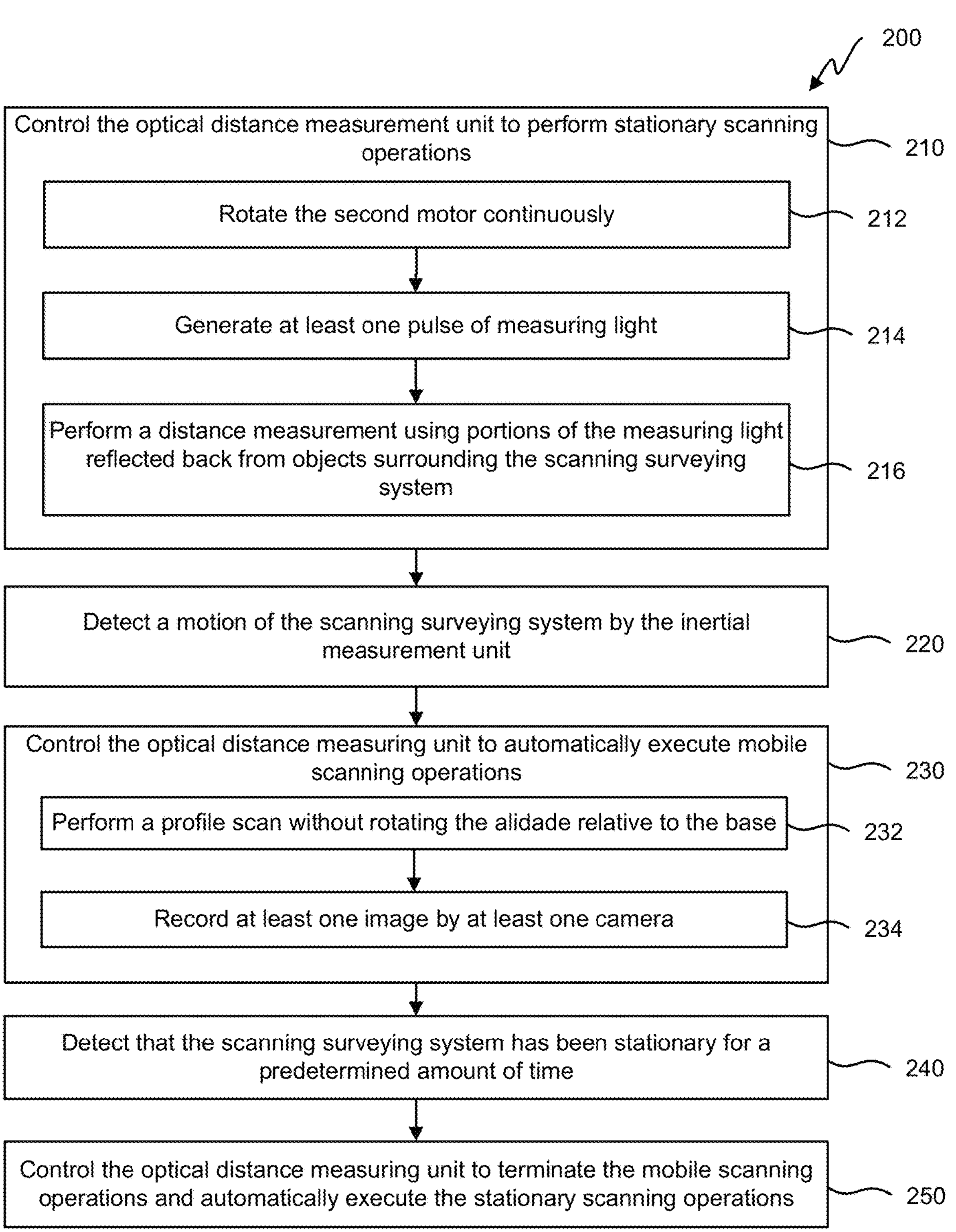
FIG. 2 is a flow chart of an embodiment of a process for controlling a scanning surveying system to automatically perform mobile scanning operations.

FIG. 2 is a flow chart of an embodiment of a process 200 for controlling a scanning surveying system 1 to automatically perform mobile scanning operations.

At block 210, the controller 19 controls the optical distance measuring unit 11 to perform stationary scanning operations. Stationary scanning operations can be performed when the scanning surveying system 1 is stationary, such as when the scanning surveying system 1 is set up at a first scanning location. Prior to performing the stationary scanning operations, the controller 19 may receive commands, such as detected touch events via a touch screen 65, for configuring settings for the stationary scanning operations. To perform the stationary scanning operations, at block 212 the controller 19 can control the second motor 17 to rotate continuously during the stationary scanning operations. Rotating the second motor 17 can cause the rotating mirror 21 to rotate relative to the alidade 7. The controller 19 can also control the first motor 6 to rotate the alidade 7 relative to the base 3.

At block 214, the controller 19 controls the optical distance measuring unit 11 to generate at least one pulse of measuring light. For example, a light source 27 within the optical distance measuring unit 11 can be triggered to generate a thin beam 33 of measuring light that is emitted through an emitting element 29. The thin beam 33 of measuring light may enter a glass prism 35, be reflected off an internal surface 37 of the prism 353, exit the prism 35 through a glass plate 39, be reflected off a mirror surface 25 of a rotating mirror 21, and be transmitted through a window 49 to leave the optical distance measuring unit 11 to be incident on objects surrounding the scanning surveying system 1. Portions of the thin beam 33 of measuring light may be reflected back from the objects towards the scanning surveying system 1.

At block 216, the controller 19 controls the optical distance measuring unit 11 to perform a distance measurement using portions of the measuring light received back from objects surrounding the scanning surveying system 1. For example, the portions of measuring light can be incident on the mirror surface 25 and can be reflected from mirror surface 25 onto a mirror 41. The mirror 41 can direct the portions of measuring light towards a focusing lens 51 that can concentrate the portions of measuring light onto a detector 53. The detector 53 can produce detection signals from the portions of measuring light, and can transmit the detection signals to the controller 19. The controller 19 can determine a distance measurement between the scanning surveying system 1 and the objects surrounding the scanning surveying system 1 by measuring a difference between a time that the at least one pulse of measuring light was generated by the light source 27 and a corresponding time when the portions of measuring light are detected by the detector 53.

At block 220, the IMU 20 detects a motion of the scanning surveying system 1. For example, the IMU 20 may detect a motion of the scanning surveying system 1 as the scanning surveying system 1 is moved from a first scanning location to a second scanning location. In some examples, the IMU 20 may include at least one of a compass, a global positioning system, or a global navigation satellite system. The compass, global positioning system, and global navigation satellite system may detect signals that can be used independently or in conjunction with the IMU 20, such as accelerometers and gyroscopes within the IMU 20, to detect the motion of the scanning surveying system 1.

At block 230, the controller 19 controls the optical distance measuring unit 11 to automatically execute mobile scanning operations. The controller 19 can control the optical distance measuring unit 11 to automatically execute the mobile scanning operations in response to the detection of motion of the scanning surveying system 1. Thus, mobile scanning operations can be performed while the scanning surveying system 1 is being moved to the second scanning location. In some embodiments, to automatically execute the mobile scanning operations, at block 232, the controller 19 controls the optical distance measuring unit 11 to perform a profile scan without rotating the alidade 7 relative to the base 3. In other embodiments, the controller 19 can control the optical distance measuring unit 11 to perform scanning operations while rotating the alidade 7 relative to the base 3.

As in the stationary scanning operations, the controller 19 can control the optical distance measuring unit 11 to rotate the second motor 17 continuously during the mobile scanning operations. Additionally, the controller 19 can control the optical distance measuring unit 11 to trigger the generation of the at least one pulse of measuring light, and to perform a distance measurement using the portions of the at least one pulse of measuring light reflected back from objects surrounding the scanning surveying system 1. At block 234, the controller 19 controls the camera 81 to record at least one image. The at least one image can be recorded during the mobile scanning operations. In some examples, the controller 19 can also control the camera 81 to record at least one image during the stationary scanning operations.

At block 240, the IMU 20 detects that the scanning surveying system 1 has been stationary for a predetermined amount of time. Examples of the predetermined amount of time may include one second or five seconds. The scanning surveying system 1 may be stationary (e.g., no longer in motion) for the predetermined amount of time after being set up at the second scanning location.

At block 250, the controller 19 controls the optical distance measuring unit 11 to terminate the mobile scanning operations and automatically execute the stationary scanning operations. In some examples, the mobile scanning operations can be terminated in response to the detection by the IMU 20 that the scanning surveying system has been stationary for the predetermined amount of time. In other words, the optical distance measuring unit 11 can automatically execute the mobile scanning operations until the IMU 20 detects that the scanning surveying system 1 has been stationary for the predetermined amount of time. In other examples, the controller 19 can control the optical distance measuring unit 11 to terminate the mobile scanning operations in response to receiving a command from a user. For example, the command can be received via a detected touch event relative to the touch screen 65. The command may be received in the event that the scanning surveying system 1 has been adjusted and not moved to a second scanning location, for example.

The controller 19 may control the optical distance measuring unit 11 to automatically execute the stationary scanning operations using the same settings as used in the prior stationary scanning operations. By automatically executing the stationary scanning operations using the same settings, the time between stationary scanning operations performed in different locations can be significantly reduced. In some examples, such as when different settings are needed for the stationary scanning operations, the automatically executing stationary scanning operations can be terminated by the controller 19 in response to receiving a command from the user. The stationary scanning operations can then be manually executed by the user.

In some examples, the distance measurements performed during the mobile scanning operations can be combined with distance measurements performed during the stationary scanning operations. The distance measurements performed during the mobile scanning operations can be used to confirm data or fill in gaps in data from the distance measurements performed during the stationary scanning operations.

Figure 3:
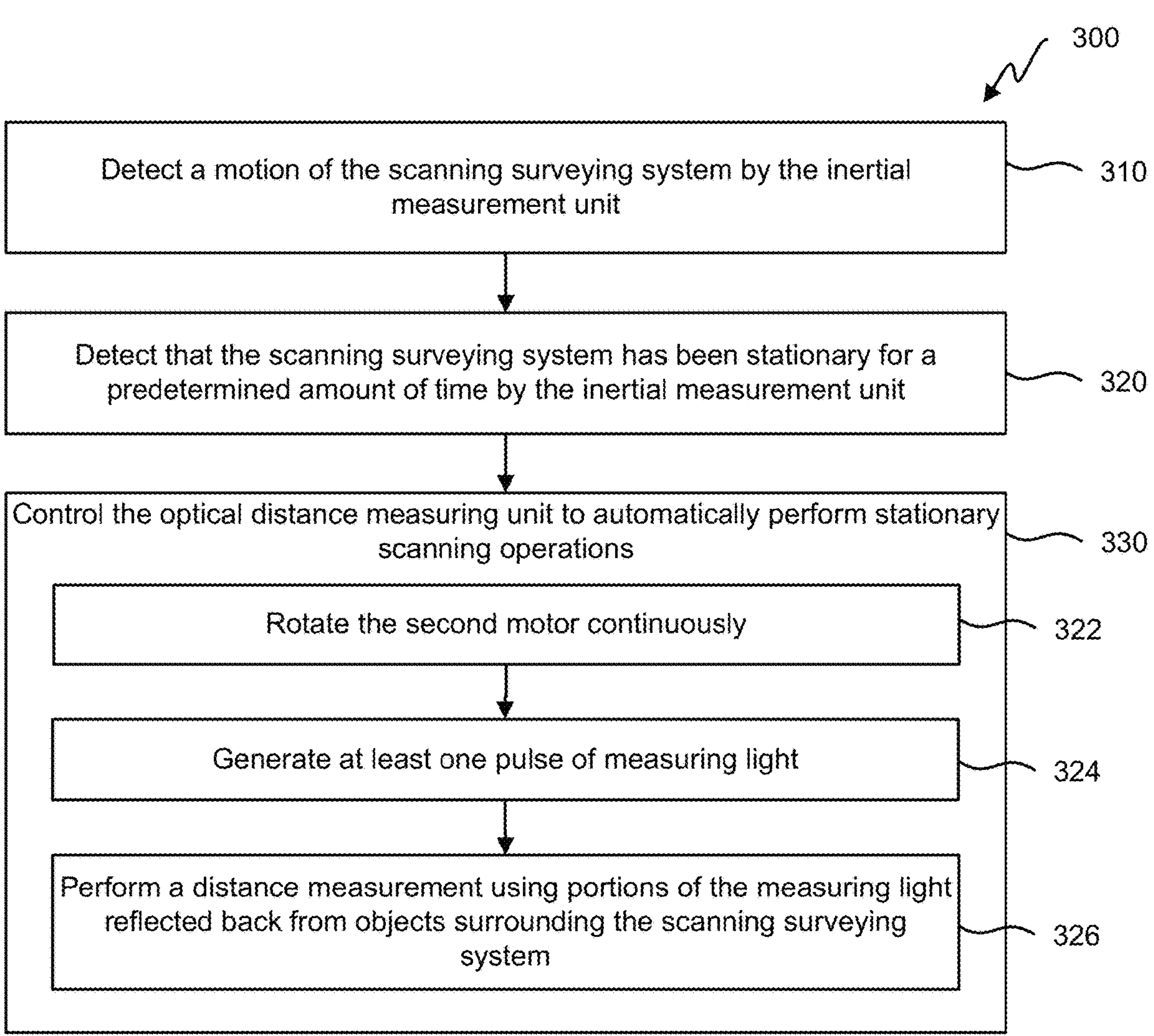
FIG. 3 is a flow chart of an embodiment of a process for controlling a scanning surveying system to automatically perform stationary scanning operations.

FIG. 3 is a flow chart of an embodiment of a process 300 for controlling a scanning surveying system 1 to automatically perform stationary scanning operations.

At block 310, the IMU 20 detects a motion of the scanning surveying system 1. For example, the IMU 20 may detect motion of the scanning surveying system 1 when the scanning surveying system 1 is being carried between scanning locations. In some examples, the IMU 20 may detect the motion of the scanning surveying system 1 in conjunction with signals received from at least one of a compass, a global positioning system, or a global navigation system coupled to the scanning surveying system 1. For example, the IMU 20 may detect motion of the scanning surveying system 1 via gyroscopes or accelerometers that can be confirmed via the global positioning system detecting signals indicating that the scanning surveying system 1 is being moved over a distance. In some examples, while the IMU 20 is detecting the motion of the scanning surveying system 1, the controller 19 may be controlling the optical distance measuring unit 11 to automatically execute mobile scanning operations as described above in relation to FIG. 2.

At block 320, the IMU 20 detects that the scanning surveying system 1 has been stationary for a predetermined amount of time. For example, the IMU 20 may detect that the scanning surveying system 1 has not been in motion for over ten seconds. Being stationary for the predetermined amount of time can indicate that the scanning surveying system 1 is no longer being moved to a scanning location, and has been set up at the scanning location to perform stationary scanning operations.

At block 330, the controller 19 controls the optical distance measuring unit 11 to automatically perform stationary scanning operations. The controller 19 may control the optical distance measuring unit 11 to automatically perform the stationary scanning operations in response to the IMU 20 detecting that the scanning surveying system 1 has been stationary for the predetermined amount of time. The optical distance measuring unit 11 can perform the stationary scanning operations according to prior settings inputted by a user. By automatically performing the stationary scanning operations after the scanning surveying system 1 is no longer in motion, an amount of time involved in performing stationary scanning operations can be reduced.

To automatically perform the stationary scanning operations, at block 322, the controller 19 controls the optical distance measuring unit 11 to rotate the second motor 17 continuously. Rotating the second motor 17 can cause the rotating mirror 21 to rotate relative to the alidade 7. The controller 19 can also control the first motor 6 to rotate the alidade 7 relative to the base 3. At block 324, the controller 19 controls the optical distance measuring unit 11 to generate at least one pulse of measuring light. For example, the optical distance measuring unit 11 can generate a thin beam 33 of measuring light that can be directed out of the scanning surveying system 1 and can be incident with objects surrounding the scanning surveying system 1. Portions of the measuring light can be reflected off the objects towards the scanning surveying system 1.

At block 326, the controller 19 controls the optical distance measuring unit 11 to perform a distance measurement using portions of the measuring light reflected back from objects surrounding the scanning surveying system 1. For example, the optical distance measuring unit 11 can receive detection signals produced from a detector 53. The detection signals can be used to determine a distance measurement between the scanning surveying system 1 and objects surrounding the scanning surveying system 1.

Figure 4:
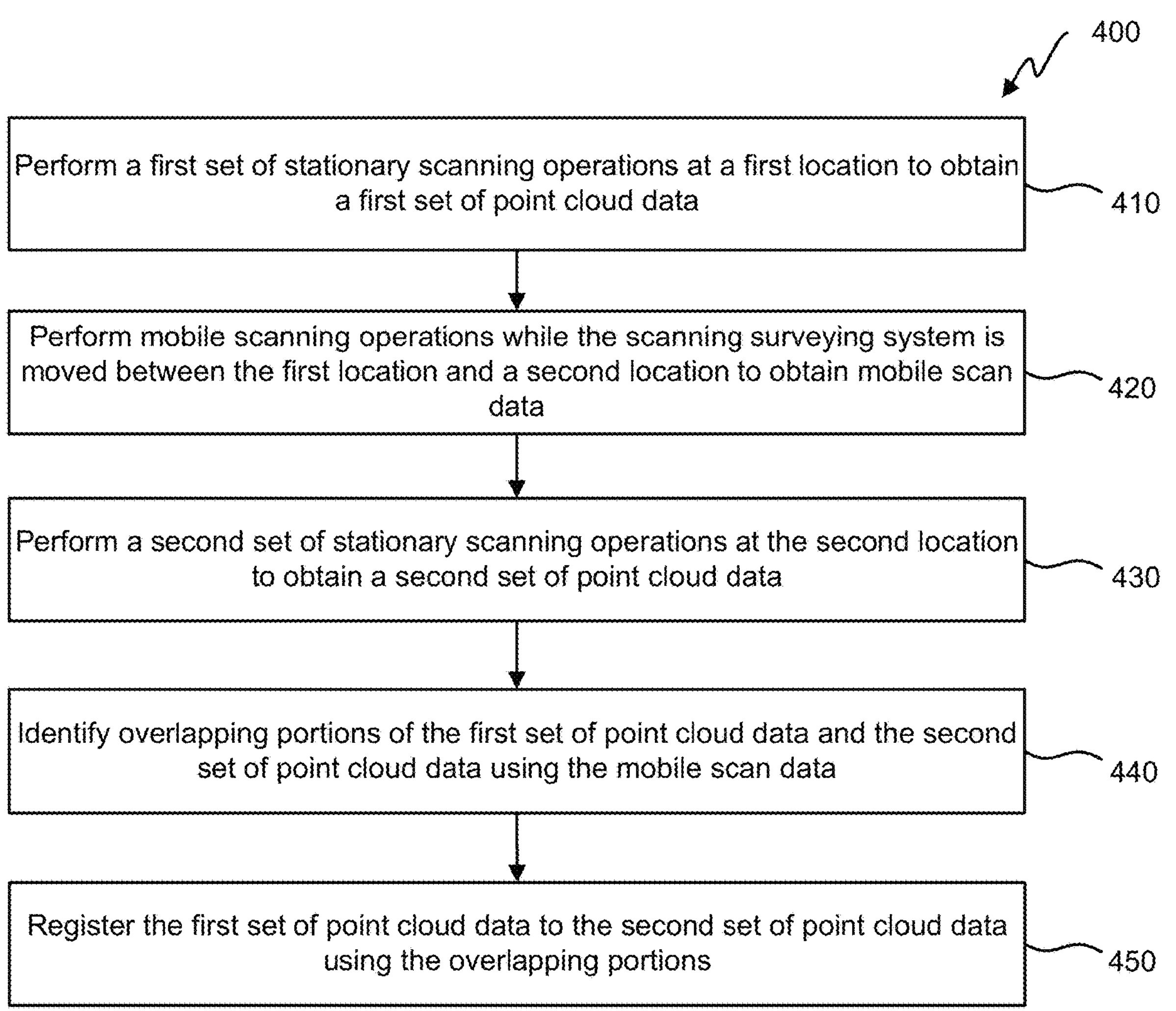
FIG. 4 is a flow chart of an embodiment of a process for registering point clouds from stationary scanning operations and mobile scanning operations performed by a scanning surveying system.

FIG. 4 is a flow chart of an embodiment of a process 400 for registering point clouds from stationary scanning operations and mobile scanning operations performed by a scanning surveying system 1. Scanning an area often requires moving the scanning surveying system 1 to different locations within the area. This allows the scanning surveying system 1 to gather point cloud data on parts of the area that may otherwise be blocked from a line of sight of the scanning surveying system 1 at some locations. The point cloud data from the different locations can be oriented and combined (i.e., registered) using overlapping portions of the point clouds. In accordance with an embodiment, point cloud data obtained from stationary scanning operations and point cloud data obtained from mobile scanning operations can be combined using stationary scan data and/or mobile scan data. For example, point cloud data obtained from stationary scanning operations performed at different locations can be combined using mobile scan data obtained from mobile scanning operations that are performed as the scanning surveying system 1 is moved between the different locations. The mobile scan data can improve the registration process by providing information on how and where the scanning surveying system 1 is moved between the different locations. This can simplify and improve accuracy of the registration process.

As illustrated at block 410 of FIG. 4, an exemplary process 400 for registering point clouds may include performing a first set of stationary scanning operations at a first location to obtain a first set of point cloud data. Block 420 includes performing mobile scanning operations while the scanning surveying system is moved between the first location and a second location to obtain mobile scan data. Block 430 includes performing a second set of stationary scanning operations at the second location to obtain a second set of point cloud data. Block 440 includes identifying overlapping portions of the first set of point cloud data and the second set of point cloud data using the mobile scan data. Block 450 includes registering the first set of point cloud data to the second set of point cloud data using the overlapping portions.

Figure 5:
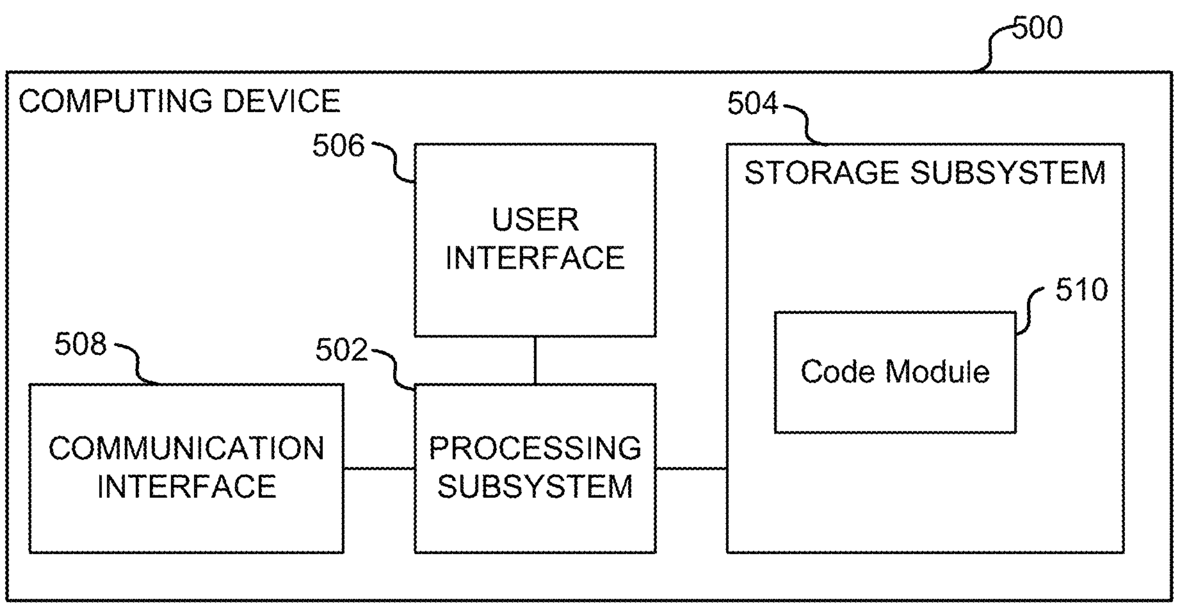
FIG. 5 is a block diagram of an embodiment of a computing device.

FIG. 5 is a diagram of an embodiment of a computing device 500. The controller 19 and/or the graphical user interface 63 may include some of the elements and features of the computing device 500 described herein.

Computing device 500 can implement some or all functions, behaviors, and/or capabilities described above that would use electronic storage or processing, as well as other functions, behaviors, or capabilities not expressly described. Computing device 500 includes a processing subsystem 502, a storage subsystem 504, a user interface 506, and/or a communication interface 508. Computing device 500 can also include other components (not explicitly shown) such as a battery, power controllers, and other components operable to provide various enhanced capabilities. In various embodiments, computing device 500 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 504 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include random access memory (RAM), including dynamic RAM (DRAM), static RAM (SRAM), or battery backed up RAM. In some embodiments, storage subsystem 504 can store one or more applications and/or operating system programs to be executed by processing subsystem 502, including programs to implement some or all operations described above that would be performed using a computer. For example, storage subsystem 504 can store one or more code modules 510 for implementing one or more method steps described above.

A firmware and/or software implementation may be implemented with modules (e.g., procedures, functions, and so on). A machine-readable medium tangibly embodying instructions may be used in implementing methodologies described herein. Code modules 510 (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module 510) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 510 may comprise sets of instructions (codes) embodied on a computer-readable medium that directs a processor of a computing device 500 to perform corresponding actions. The instructions may be configured to run in sequential order, in parallel (such as under different processing threads), or in a combination thereof. After loading a code module 510 on a general purpose computer system, the general purpose computer is transformed into a special purpose computer system.

Computer programs incorporating various features described herein (e.g., in one or more code modules 510) may be encoded and stored on various computer readable storage media.

Computer readable media encoded with the program code may be packaged with a compatible electronic device, or the program code may be provided separately from electronic devices (e.g., via Internet download or as a separately packaged computer-readable storage medium). Storage subsystem 504 can also store information useful for establishing network connections using the communication interface 508.

User interface 506 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital-to-analog or analog-to-digital converters, signal processors, etc.). A user can operate input devices of user interface 506 to invoke the functionality of computing device 500 and can view and/or hear output from computing device 500 via output devices of user interface 506. For some embodiments, the user interface 506 might not be present (e.g., for a process using an ASIC).

Processing subsystem 502 can be implemented as one or more processors (e.g., integrated circuits, one or more single-core or multi-core microprocessors, microcontrollers, central processing unit, graphics processing unit, etc.). In operation, processing subsystem 502 can control the operation of computing device 500. In some embodiments, processing subsystem 502 can execute a variety of programs in response to program code and can maintain multiple concurrently executing programs or processes. At a given time, some or all of a program code to be executed can reside in processing subsystem 502 and/or in storage media, such as storage subsystem 504. Through programming, processing subsystem 502 can provide various functionality for computing device 500. Processing subsystem 502 can also execute other programs to control other functions of computing device 500, including programs that may be stored in storage subsystem 504.

Communication interface 508 can provide voice and/or data communication capability for computing device 500. In some embodiments, communication interface 508 can include radio frequency (RF) transceiver components for accessing wireless data networks (e.g., Wi-Fi network; 3G, 4G/LTE; etc.), mobile communication technologies, components for short-range wireless communication (e.g., using Bluetooth communication standards, NFC, etc.), other components, or combinations of technologies. In some embodiments, communication interface 508 can provide wired connectivity (e.g., universal serial bus, Ethernet, universal asynchronous receiver/transmitter, etc.) in addition to, or in lieu of, a wireless interface. Communication interface 508 can be implemented using a combination of hardware (e.g., driver circuits, antennas, modulators/demodulators, encoders/decoders, and other analog and/or digital signal processing circuits) and software components. In some embodiments, communication interface 508 can support multiple communication channels concurrently. In some embodiments, the communication interface 508 is not used.

It will be appreciated that computing device 500 is illustrative and that variations and modifications are possible. A computing device can have various functionality not specifically described (e.g., voice communication via cellular telephone networks) and can include components appropriate to such functionality.

Further, while the computing device 500 is described with reference to particular blocks, it is to be understood that these blocks are defined for convenience of description and are not intended to imply a particular physical arrangement of component parts. For example, the processing subsystem 502, the storage subsystem 504, the user interface 506, and/or the communication interface 508 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 500.

Various features described herein, e.g., methods, apparatus, computer-readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Some embodiments have been described in connection with the accompanying drawing.

However, it should be understood that the figure is not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

The invention claimed is:

1. A scanning surveying system, comprising:

a base;

an alidade mounted on the base and rotatable relative to the base about a first axis;

a first motor configured to rotate the alidade relative to the base;

a rotating optical element coupled to the alidade and rotatable relative to the alidade about a second axis;

a second motor configured to rotate the rotating optical element relative to the alidade;

an optical distance measuring unit configured to direct measuring light onto the rotating optical element such that the measuring light is directed towards objects surrounding the scanning surveying system, and to receive portions of the measuring light reflected back from the objects;

a sensor configured to detect a motion of the scanning surveying system; and a controller configured to control the optical distance measuring unit (i) to perform stationary scanning operations, and (ii) to automatically execute mobile scanning operations in response to a detection of motion of the scanning surveying system by the sensor.

2. The scanning surveying system according to claim 1, wherein the controller is also configured to register stationary scan data from the stationary scanning operations using mobile scan data from the mobile scanning operations, and/or wherein the controller is also configured to register the mobile scan data from the mobile scanning operations using stationary scan data from the stationary scan operations.

3. The scanning surveying system according to claim 1, wherein the optical distance measuring unit is configured to generate at least one pulse of the measuring light and to perform a distance measurement using portions of the at least one pulse of the measuring light during the stationary scanning operations and the mobile scanning operations, and wherein the controller is configured to control the second motor to rotate continuously during the stationary scanning operations and the mobile scanning operations, and to trigger the generation of the at least one pulse of the measuring light and the performing of the distance measurement during the stationary scanning operations and the mobile scanning operations.

4. The scanning surveying system according to claim 1, wherein the optical distance measuring unit is configured to automatically execute the mobile scanning operations until the sensor detects that the scanning surveying system is stationary for a predetermined amount of time, and wherein the controller is configured to control the optical distance measuring unit to terminate the mobile scanning operations and to automatically execute the stationary scanning operations in response to the detection of the scanning surveying system being stationary for the predetermined amount of time.

5. The scanning surveying system according to claim 1, wherein the controller is configured to control the optical distance measuring unit to terminate the mobile scanning operations in response to receiving a command from a user, and further comprising a user interface including a touch screen, and wherein the controller is configured to receive the command from the user to terminate the mobile scanning operations via a detected touch event relative to the touch screen.

6. The scanning surveying system according to claim 1, wherein the sensor is an inertial measurement unit configured to detect the motion of the scanning surveying system in conjunction with signals received from at least one of a compass, a global positioning system, or a global navigation satellite system.

7. The scanning surveying system according to claim 1, wherein the mobile scanning operations comprises a profile scan without rotating the alidade relative to the base.

8. The scanning surveying system according to claim 1, further comprising at least one camera configured to record at least one image during the mobile scanning operation.

9. A method of operating a scanning surveying system, wherein the scanning surveying system comprises:

a base;

an alidade mounted on the base and rotatable relative to the base about a first axis;

a first motor configured to rotate the alidade relative to the base;

a rotating optical element coupled to the alidade and rotatable relative to the alidade about a second axis;

a second motor configured to rotate the rotating optical element relative to the alidade;

an optical distance measuring unit configured to direct measuring light onto the rotating optical element such that the measuring light is directed towards objects surrounding the scanning surveying system, and to receive portions of the measuring light reflected back from the objects;

a sensor configured to detect a motion of the scanning surveying system; and a controller configured to control the optical distance measuring unit;

wherein the method comprises:

controlling, by the controller, the optical distance measuring unit to perform stationary scanning operations;

detecting, by the sensor, a motion of the scanning surveying system; and in response to detecting the motion of the scanning surveying system, controlling, by the controller, the optical distance measuring unit to automatically perform mobile scanning operations.

10. The method according to claim 9, wherein the stationary scanning operations are first stationary scanning operations, and after controlling the optical distance measuring unit to automatically perform the mobile scanning operations, the method further comprises:

controlling, by the controller, the optical distance measuring unit to perform second stationary scanning operations; and registering, by the controller, first point cloud data from the first stationary scanning operations and second point cloud data from the second stationary scanning operations using mobile scan data from the mobile scanning operations.

11. The method according to claim 9, further comprising:

generating, by the optical distance measuring unit, at least one pulse of the measuring light and performing a distance measurement using the portions of the at least one pulse of the measuring light during the stationary scanning operations and the mobile scanning operations, and controlling, by the controller, the second motor to rotate continuously during the stationary scanning operations and the mobile scanning operations and to trigger the generation of the at least one pulse of the measuring light and the performing of the distance measurement during the stationary scanning operations and the mobile scanning operations.

12. The method according to claim 9, wherein controlling the optical distance measuring unit to perform the mobile scanning operations further comprises:

automatically executing, by the optical distance measuring unit, the mobile scanning operations until the sensor detects that the scanning surveying system is stationary for a predetermined amount of time.

13. The method according to claim 12, further comprising:

controlling, by the controller, the optical distance measuring unit to terminate the mobile scanning operations and to automatically execute the stationary scanning operations in response to the detection of the scanning surveying system being stationary for the predetermined amount of time.

14. The method according to claim 9, wherein controlling the optical distance measuring unit to terminate the mobile scanning operations further comprises terminating the mobile scanning operations in response to receiving a command from a user.

15. The method according to claim 14, wherein the scanning surveying system further comprises a user interface including a touch screen, and wherein receiving the command from the user comprises receiving the command via a detected touch event relative to the touch screen.

16. The method according to claim 9, wherein detecting the motion of the base further comprises detecting, by the sensor, the motion of the scanning surveying system in conjunction with signals received from at least one of a compass, a global positioning system, or a global navigation satellite system.

17. The method according to claim 9, wherein the mobile scanning operation comprises performing a profile scan without rotating the alidade relative to the base.

18. The method according to claim 9, wherein the scanning surveying system further comprises at least one camera, and wherein the method further comprises recording, by the at least one camera, at least one image during the mobile scanning operation.

19. A scanning surveying system, comprising:

a base;

an alidade mounted on the base and rotatable relative to the base about a first axis;

a first motor configured to rotate the alidade relative to the base;

a rotating optical element coupled to the alidade and rotatable relative to the alidade about a second axis;

a second motor configured to rotate the rotating optical element relative to the alidade;

an optical distance measuring unit configured to direct measuring light onto the rotating optical element such that the measuring light is directed towards objects surrounding the scanning surveying system, and to receive portions of the measuring light reflected back from the objects;

a sensor configured to detect a motion of the scanning surveying system; and a controller configured to control the optical distance measuring unit to automatically perform stationary scanning operations in response to a detection that the scanning surveying system has been stationary for a predetermined amount of time after a detection of motion by the sensor.

20. A method of operating a scanning surveying system, wherein the scanning surveying system comprises:

a base;

an alidade mounted on the base and rotatable relative to the base about a first axis;

a first motor configured to rotate the alidade relative to the base;

a rotating optical element coupled to the alidade and rotatable relative to the alidade about a second axis;

a second motor configured to rotate the rotating optical element relative to the alidade;

an optical distance measuring unit configured to direct measuring light onto the rotating optical element such that the measuring light is directed towards objects surrounding the scanning surveying system, and to receive portions of the measuring light reflected back from the objects;

a sensor configured to detect a motion of the scanning surveying system; and a controller configured to control the optical distance measuring unit;

wherein the method comprises:

detecting, by the sensor, a motion of the scanning surveying system;

subsequent to detecting the motion of the scanning surveying system, detecting, by the sensor, that the scanning surveying system has been stationary for a predetermined amount of time; and in response to detecting that the scanning surveying system has been stationary for the predetermined amount of time, controlling, by the controller, the optical distance measuring unit to automatically perform stationary scanning operations.

* * * * *